United States Patent [19]

Huebert

[11] 3,917,440
[45] Nov. 4, 1975

[54] TIRE CURING CHAMBER

[76] Inventor: Ben R. Huebert, 233 W. Ponderosa, Reedley, Calif. 93654

[22] Filed: Feb. 7, 1975

[21] Appl. No.: 547,816

[52] U.S. Cl. .................................. 425/18; 425/34 A
[51] Int. Cl.² .......................................... B29H 5/04
[58] Field of Search ................ 425/18, 34 A, 40, 43

[56] References Cited
UNITED STATES PATENTS

| 1,152,993 | 9/1915 | Thropp | 425/34 A |
| 1,931,923 | 10/1933 | Denmire | 425/34 A |
| 2,254,415 | 9/1941 | Boyd et al. | 425/34 A |
| 3,669,581 | 6/1972 | Maurer et al. | 425/34 A |
| 3,827,839 | 8/1974 | Pechacek et al. | 425/34 A |

Primary Examiner—J. Howard Flint, Jr.
Attorney, Agent, or Firm—Huebner & Worrel

[57] ABSTRACT

A tire curing chamber including a tank adapted to receive a multiplicity of tires in stacked relation in substantial axial alignment, opposed plates engageable with opposite ends of the stack, means mounting the plates in adjustable spaced relation to compress the tires in substantially airtight relation therebetween and to release the tires, one of said plates being ported to the atmosphere internally of the tires and the other being substantially fluid tight and with the tank defining a compartment externally of the tires, and a source of steam under pressure connected to said external compartment whereby when the external compartment is pressurized the plates are urged relatively toward each other, the adjustable mounting means having facility for limiting movement of the plates relatively toward each other incident to steam pressure in said external compartment.

7 Claims, 6 Drawing Figures

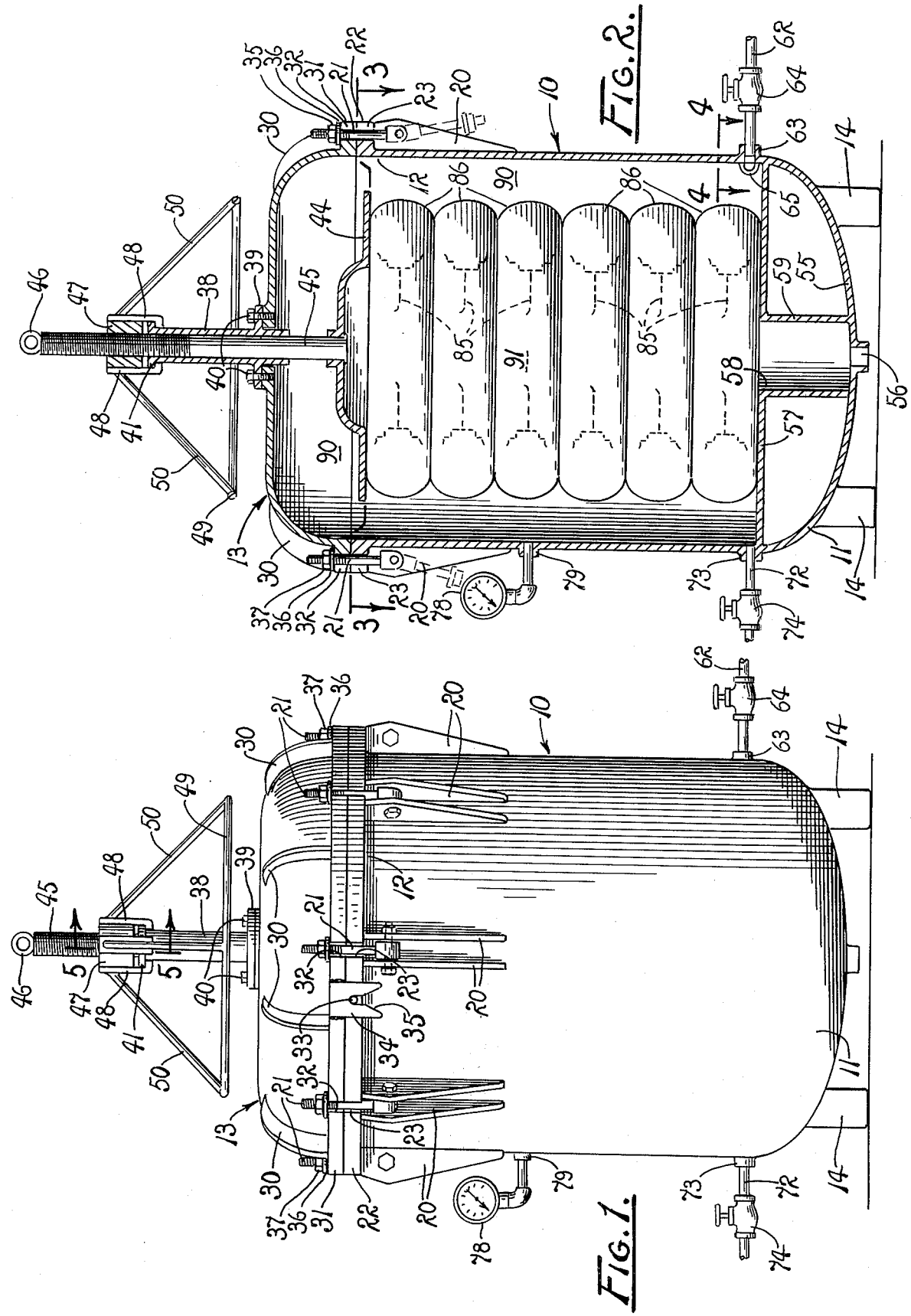

TIRE CURING CHAMBER

BACKGROUND OF THE INVENTION

The present invention relates to a tire curing chamber and more particularly to such a chamber adapted to receive a multiplicity of tires in axially stacked relation, to compress the tires into substantially fluid tight engagement, to define a compartment internally of the rires open to the atmosphere and a fluid tight compartment externally of the tires, and having a source of steam under pressure connected to the external compartment.

It is well known in the retreading of tires to buff away the old tread from used tire carcasses, to bond new tread, sometimes referred to as "camel backs", to the buffed carcasses, and to cure the retreaded carcasses by subjecting them to high temperatures and steam pressures.

The curing procedure is usually performed in horizontal tanks into which a multiplicity of tires having new tread bonded thereto are positioned in side by side engagement. It is desired to compress the tire into airtight engagement between opposite ends of the tank for reasons which will subsequently be understood. However, the tires are unmounted, uninflated and groups thereof ready for curing vary greatly in axial length when they are disposed in their side by side relation. It is the conventional practice to add shims to the axially aligned tires to augment their over-all length sufficiently to permit compression between opposite ends of the tanks. Shimming the tires is a time consuming and laborious procedure adding significantly to tire retreading costs. It is an erratic procedure which almost always leads to insufficient or excessive tire compression because of lack of precision in selecting the shims to utilize. Being unmounted and uninflated, the tires are frequently distorted by such under compression or over compression, by pressure differentials between the exterior and interior of the tires, by support of the tires on their new treads while being cured and by other failures to exercise precise control.

In previous instances, even when the tires have been stacked vertically in curing chambers, it has not been practical to compress stacks of inflated tires sufficiently to achieve steam tight integrity. Thus, the industry has considered it impractical to cure the tires when inflated. When uninflated but stacked vertically, the lower tires are compressed more than the upper tires and thus are prone to be distorted. If the stack is compressed downwardly sufficiently to bring the upper tires into steam tight engagement, the lower tires are excessively compressed and further distorted.

SUMMARY OF THE INVENTION

The broad object of the present invention is therefore to provide retreaded tires of improved quality at reduced costs.

Another object is to provide an improved tire curing chamber.

Another object is to minimize tire distortion during curing procedures.

Another object is to provide a tire curing chamber adapted to receive tires in stacked axially erect relation.

Another object is to provide a tire curing chamber which is adjustable quickly, easily and precisely to compress stacks of tires therein even though such stacks vary in axial length.

Another object is to cure tires while they are inflated and mounted on their wheels or rims to save time, labor and expense and to achieve better precision of control.

Another object is to provide an improved tire curing chamber in which initial compression of a stack of tires is effected to bring the tires into sufficient engagement to permit initial pressurization of the chamber externally of the tires and in which the steam pressure is utilized further to compress the stack of tires to resist leakage at higher steam pressures.

Another object is to provide a curing chamber of the character set forth in the preceding object in which the means for effecting the initial compression is adjustable to limit the maximum compression to which the tires can be subjected by the steam.

Further objects are to provide improved elements and arrangements thereof in a tire curing chamber which is economical, efficient, and easier to use than currently employed in the industry.

Still further objects and advantages will become apparent in the subsequent description in the specification.

BRIEF DESCRIPTION OF THE DRAWINGS

In the drawings:

FIG. 1 is a side elevation of a tire curing chamber embodying the principles of the present invention.

FIG. 2 is a vertical section of the chamber of FIG. 1 showing in dashed line tires to be cured disposed therein on their respective wheels.

DESCRIPTION

Figure 3:
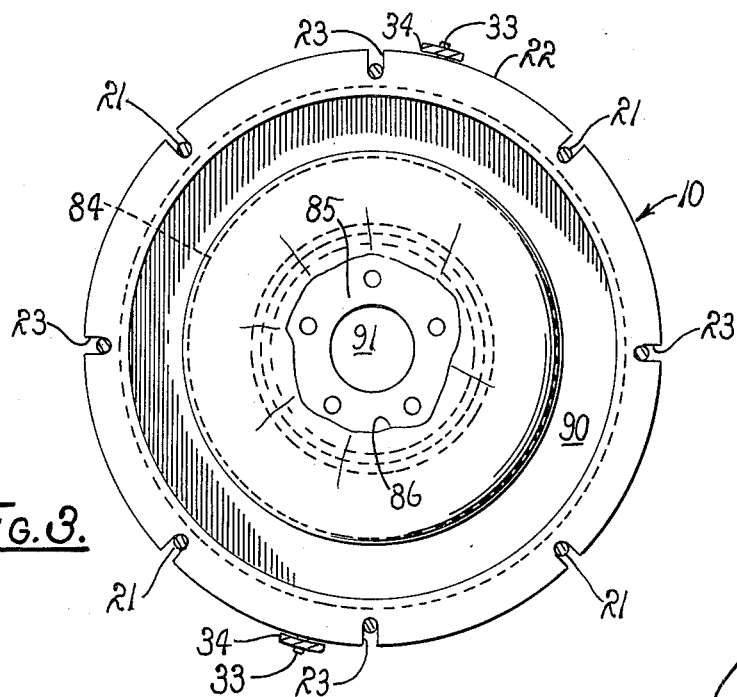
FIG. 3 is a section taken at the position indicated at 3—3 in FIG. 2.
Figure 4:
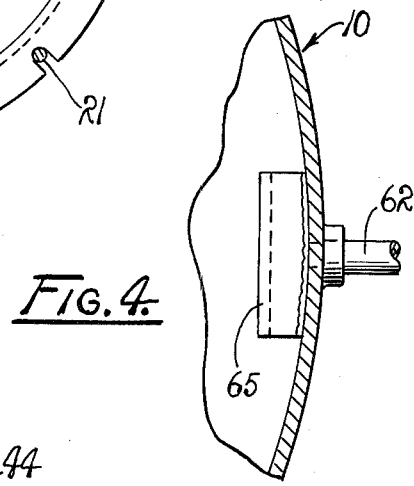
FIG. 4 is a section taken at the position indicated at 4—4 in FIG. 2.

Referring in greater detail to the drawings:

The chamber best seen in FIGS. 1 and 2 has a substantially axially erect cylindrical tank 10 having a lower end 11 and an upper end 12. The upper end has a closure 13 movable between a closed position shown in FIGS. 1 and 2 and an open position removed from the tank. The lower end is provided with legs 14 which support the tank in upright attitude.

Pairs of erect mounting brackets 20 are provided on the tank 10 adjacent to the upper end 12. A clamping bolt 21 is pivotally mounted between the brackets of each pair for movement between upright positions shown in full line in FIGS. 1 and 2 and retracted positions shown in dashed line in FIG. 2. The upper end of the tank has a peripheral rim 22 which is periodically notched at 23 to receive the clamping bolts in upright positions.

The closure 13 is preferably substantially bell or dome shaped, is ribbed at 30 for increased strength, and has a lower rim 31 congruent to the rim 22 which is correspondingly peripherally notched at 32. To facilitate positioning of the closure on the rim 22, a pair of diametrically related studs 33 are outwardly extended from the rim 22. A guide 34 having a V-shaped slot 35 is provided in a downwardly disposed position on the closure 13 adjacent to each stud. When the closure has been removed from the tank, its reassembly with the tank is facilitated by lowering it in juxtaposition to the rim 22 and sliding the guides downwardly over the studs. The bolts 21 are then pivoted upwardly so as to nest in their respective notches 23 and 32, washers 35 applied to the bolts and nuts 36 tightened downwardly against the washers to draw the closure into airtight engagement with the tank.

A tube 38 is mounted coaxially in the closure 13 and upwardly extended therefrom. The tube conveniently provides a flange 39 which is bolted at 40, or otherwise secured, to the closure in fluid tight relation thereon. The upper end of the tube is circumscribed by an upper flange 41.

An impervious circular plate 44, having a diameter less than that of the tank 10 is disposed in the tank adjacent to the upper end 12 thereof. A shaft 45 is rigidly secured to the center of the plate and journaled in the tube 38 in substantially fluid tight relation thereto. Packing, not shown, is utilized between the shaft and tube as desired. The upper end of the shaft is screw-threaded and preferably provides a lifting eyelet 46. A nut 47 is screw-threadedly mounted on the shaft so as to be tightened down against the flange 41 to lift the plate 44. Fingers 48 are provided integrally with the nut, extended downwardly passed the nut and thence inwardly in downwardly spaced relation to the nut to capture the nut so that it has a limited range of movement axially with respect to the flange 41. While such range is not precisely critical, in most instances an inch or two is appropriate, it is important for reasons which will subsequently be apparent. For convenience of operation, an annular handle 49 is mounted concentrically on the nut by means of struts 50.

The lower end 11 has an inverted dome shaped permanent closure 55 having a central opening 56. A false bottom or lower end wall 57 is welded transversely in the lower end of the tank 10. The false bottom has a central opening 58 and a tubular support 59 which interconnects the lower closure 55 and the false bottom 57 in communication between the openings 56 and 58.

A pipe 62 for supplying steam under pressure to the tank 11 is connected to the tank at 63 and provides a control valve 64 therein. A semi-cylindrical baffle 65 is welded to the inside of the tank transversely of the pipe so as to disperse steam under pressure received therethrough and to avoid any undesirable excessive concentration of heat.

An outlet pipe 72 is connected to the tank 10 at 73 and has a control valve 74 therein.

A pressure gauge 78 is preferably connected to the side of the tank, as at 79.

OPERATION

The operation of the tire curing chamber of the present invention is believed to be clearly apparent and is briefly summarized at this point. The closure 13 is removed by loosening the nuts 37 and pivoting the bolts 21 downwardly to their dashed line positions shown in FIG. 2. Any suitable hoisting mechanism, not shown, is connected to the eyelet 46 and the closure, plate 44, shaft 45 and their appurtenant elements lifted from the tank 10.

Figure 6:
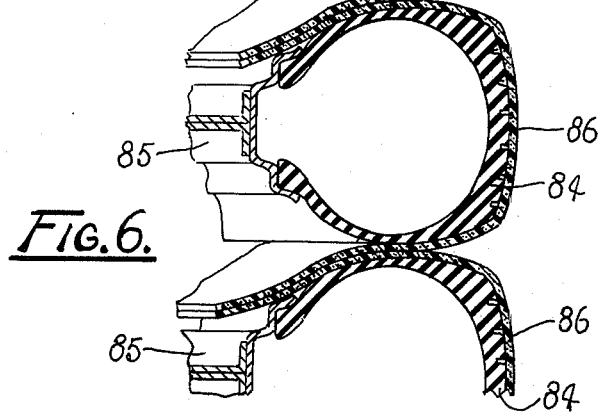
FIG. 6 is a somewhat enlarged fragmentary vertical section of a stack of tires and a compression plate as employed in the chamber.

A multiplicity of inflated tires 84 mounted on their wheels 85 are stacked in the tank 10 with the lowermost tire rested on the false bottom 57 in circumscribing relation to the opening 56. Before being stacked, each tire preferably has a wrapper 86 of sheet rubber or other elastic and compressible material tensioned peripherally thereabout. The wrappers not only encompass the tread on the tires but extend beneath the side of the lowermost tire, between the adjacent tires and over the side of the uppermost tire, as best seen in FIG. 6. In each position, the wrapper acts as a gasket when placed under compression.

Figure 5:
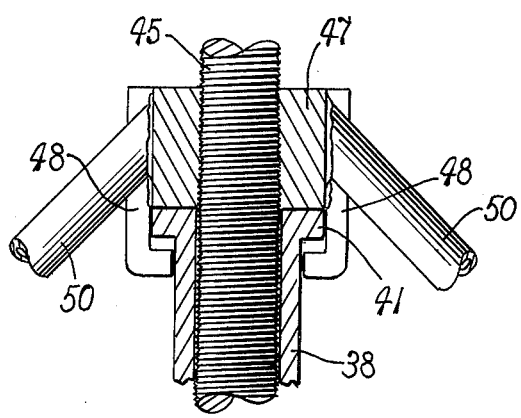
FIG. 5 is a section taken on line 5—5 of FIG. 1.

When the tires 84 have been stacked, the eyelet 46 is utilized to lift the shaft 45, plate 44, closure 13 and appurtenant elements back onto the tank 10 with the rims 22 and 31 in rested juxtaposed position. The bolts 21 are then pivoted upwardly into the slots 23 and 32 as shown in full line in FIGS. 1 and 2. The washers 36 are placed on their bolts and rested on the rim 31 of the closure 13 and the nuts 37 tightened downwardly to bring the closure into fluid tight engagement with the tank 10, The handle 45 is then rotated to lower the plate 44 toward the stack of tires 84. At such time the plate is suspended on the shaft 45 with the nut 47 rested on the flange 41. Rotation of the nut is continued until the plate reaches the uppermost tire and is further continued until initial pressure is exerted downwardly on the uppermost tire sufficiently to compress the stack thereof to bring the inflated tires into low pressure steam tight engagement with each other and with the plates 57 and 44 through the medium of the wrappers 86 disposed therebetween. As the nut is tightened it rises on the flange 41 until such movement is limited by the engagement of the fingers 48 with the underside of the flange. This condition is shown in FIGS. 1, 2, and 5. The nut is firmly tightened but it is found impractical to achieve sufficient compression of the tires by such easily manipulated mechanical means to resist high pressure steam. It will be observed that so assembled the tires 84, wrappers 86, plate 41, false bottom 57, tank 10 and closure 13 form an hermetically sealed outer compartment 90 which is isolated from an inner compartment 91 within the tires which is open to the atmosphere through the openings 56 and 57 and tubular support 59.

With the valve 74 closed, the valve 64 is opened to admit steam into the outer compartment 90 through the pipe 62. As the steam enters, it strikes the baffle 65 which serves to disperse the inwardly jetting steam to avoid any undue concentration of heat from the steam by direct impingement against a tire 84. Air is frequently entrapped between the wrappers 86 and their respective tires. As the steam enters the outer compartment 90, it compresses the wrappers against their respective tires to press such air into the interior compartment 91 where it is vented through the openings 58 and 56 to the atmosphere.

As the steam is admitted to the external compartment 90, it presses downwardly on the plate 44 to increase the compression of the stack of tires 84. As the compression of the tires continues, the plate 44, shaft 45 and nut 47 move downwardly until the nut reaches the upper side of the flange 41 which is its absolute limit of movement unless the nut is rotated to raise or to lower it. An inch or two of relative travel between the nut and the flange achieves high pressure steam tight integrity of the stack of tires and the plates 44 and 57. Thus, the steam pressure under the limitations established by the nut and finger travel in relation to the flange is utilized to compress the inflated tires. No matter how much the steam pressure is increased, further compression of the stack of tires beyond the limit predetermined by the initial nut setting is impossible. Thus, tire distortion by excessive or insufficient compression is obviated.

The tires 84 are retained in the chamber at the proper temperature for sufficient time to effect the desired curing of the tires, that is the effective bonding of new circumscribing bands of rubber or camel backs, to the casings of the tires. During this entire period, the camel backs are compressed at a uniform pressure tightly against the casings by the steam pressure.

When the curing is completed, the valve 64 is closed and the valve 74 opened to exhaust the outer compartment 90 of the tank 10. As the outer chamber 90 returns to atmospheric pressure, the plate 44, shaft 45 and nut 47 rise because of the resilience of the stack of tires until the fingers 48 engage the undersurface of the flange 41. The nut 47 is then rotated to lift the plate 44 to relieve the stack of tires 84 from compression. The nuts 37 are then retracted, the bolts 21 pivoted outwardly and downwardly to release the closure 13, and the eyelet 46 used to hoist the closure, plate 44, shaft 45 and appurtenant structure from the tank. The tires 84 and their wheels 85 are then lifted from the tank.

Use of the handle 45 to manipulate the nut 47 permits the curing chamber of the present invention to be adjusted quickly and with absolute precision to accommodate stacks of tires of varied axial length. The precision of compression makes it possible to achieve the initial low steam pressure integrity between the tires 84 and between the tires and the plates 44 and 57. The initial setting of the nut and the spacing between the flange 41 and the nut as the nut is screwed down absolutely limits the maximum downward movement of the plate 44 by steam pressure thereagainst permitted to compress the tires no matter how much the steam pressure is increased.

By curing the tires while mounted and inflated, time and expense are saved and a superior product achieved. This also permits the tires 84 to be stacked in the much more convenient axially erect position without collapsing the lower tires. The steam pressure in the compartment 90 on the upper surface of the plate 44 is utilized to increase compression of the stack of tires with the positioning of the nut 47 and fingers 48 in relation to the flange 41 obviating excessive compression and tire distortion. The atmospheric pressure in the inner compartment 91 permits the bleeding off of any air entrapped between the wrappers 86 and the tires 84 or between the carcasses and camel backs of the tires under the much greater pressure in the outer compartment 91. The improved curing chamber of the present invention has permitted the production of superior retreaded tires at a lower cost.

Although the chamber of the present invention has been described in terms of use for retreading tires, it is to be understood that it could be used on new tires if desired for such purpose.

Although the invention has been herein shown and described in what is conceived to be the most practical and preferred embodiment, it is recognized that departures may be made therefrom within the scope of the invention.

Having described my invention, what I claim as new and desire to secure by Letters Patent is:

1. A tire curing chamber comprising a tank adapted to receive a plurality of tires therein in stacked relation: means for axially compressing the tires into substantially airtight engagement so as to form substantially isolated compartments in the tank, one thereof interiorly of the stacked tires and another exteriorly thereof; means for supplying steam under pressure to the exterior compartment; and means opening the interior compartment to the atmosphere.

2. The chamber of claim 1 in which the compression means includes an impervious plate engaged with the stacked tires; and means for adjustably moving the plate axially toward and from the stack.

3. The chamber of claim 2 in which the exterior compartment extends across the plate externally thereof whereby the steam under pressure exerts an inward thrust on the plate axially of the stack; and the adjustable moving means limits movement of the plate toward the stack to resist excessive compression thereof.

4. The apparatus of claim 2 in which the adjustable moving means comprises a screw-threaded shaft mounted on the plate and axially extended away from the stack; a nut screw-threaded on the shaft; and means mounting the nut in spaced relation to the tank whereby rotation of the nut adjusts the shaft and plate toward and from the stack.

5. The apparatus of claim 2 in which the adjustable moving means comprises a tube mounted on the tank and extended therefrom axially of the stack having an outer end circumscribed by a flange; a screw-threaded shaft mounted on the plate and extended through the tube, a nut screw-threadedly mounted on the shaft for engagement with one side of the flange having fingers integral therewith extended about the peripheral edge of the flange for engagement with the opposite side thereof positively to limit movement of the nut toward and from the flange; and means for rotating the nut whereby the plate is movable, from and toward the stack to compress the tires but limits such movement of the plate towards the stack incident to steam pressure on the plate.

6. The apparatus of claim 1 including gaskets individually circumscribing the tires and extended between the tires to minimize leakage of steam therebetween.

7. A tire curing chamber comprising
A. a substantially cylindrical tank having an opening to the atmosphere at one end and an opposite end having a releasably removable closure, said tank being adapted to receive tires in stacked relation therein in circumscribing relation to the opening;
B. an airtight compression plate adapted to engage the stack of tires adjacent to the removable closure;
C. means mounted on the closure connected to the plate operable to urge the plate toward the stack of tires to compress the same in the chamber into airtight engagement; and
D. means for admitting steam to the chamber externally of the tires while the interior of the tires are open to the atmosphere through said opening.

* * * * *